United States Patent
Isele et al.

(10) Patent No.: US 11,586,974 B2
(45) Date of Patent: Feb. 21, 2023

(54) SYSTEM AND METHOD FOR MULTI-AGENT REINFORCEMENT LEARNING IN A MULTI-AGENT ENVIRONMENT

(71) Applicant: Honda Motor Co., Ltd., Tokyo (JP)

(72) Inventors: David Francis Isele, Sunnyvale, CA (US); Kikuo Fujimura, Palo Alto, CA (US); Anahita Mohseni-Kabir, Pittsburgh, PA (US)

(73) Assignee: HONDA MOTOR CO., LTD., Tokyo (JP)

( * ) Notice: Subject to any disclaimer, the term of this patent is extended or adjusted under 35 U.S.C. 154(b) by 948 days.

(21) Appl. No.: 16/390,224

(22) Filed: Apr. 22, 2019

(65) Prior Publication Data

US 2020/0090074 A1     Mar. 19, 2020

Related U.S. Application Data

(60) Provisional application No. 62/731,426, filed on Sep. 14, 2018.

(51) Int. Cl.
*G06N 20/00*     (2019.01)
*G06F 30/20*     (2020.01)

(52) U.S. Cl.
CPC ............ *G06N 20/00* (2019.01); *G06F 30/20* (2020.01)

(58) Field of Classification Search
CPC ............... G05D 1/0221; G05D 1/0088; G05D 2201/0213; B60W 30/085; B60W 50/00; B60W 2050/0005; B60W 2050/0019; G08G 1/167; G06N 20/00; G06N 3/006; G06N 3/08; G06N 7/005; G06F 30/20; G06F 2111/10; G06F 30/27
See application file for complete search history.

(56) References Cited

U.S. PATENT DOCUMENTS

| | | | | |
|---|---|---|---|---|
| 7,139,411 B2 * | 11/2006 | Fujimura | ............ | G06V 20/182 348/169 |
| 9,630,318 B2 * | 4/2017 | Ibarz Gabardos | ... | G05D 1/0246 |

OTHER PUBLICATIONS

S. V. Albrecht and P. Stone, "Autonomous agents modelling other agents: A comprehensive survey and open problems," Artificial Intelligence, 2018.
H. Bai, S. Cai, N. Ye, D. Hsu, and W. Lee, "Intention-aware online pomdp planning for autonomous driving in a crowd," in ICRA, 2015.

(Continued)

*Primary Examiner* — Robert G Bachner
(74) *Attorney, Agent, or Firm* — Rankin, Hill & Clark LLP

(57) ABSTRACT

A system and method for multi-agent reinforcement learning in a multi-agent environment that include receiving data associated with the multi-agent environment in which an ego agent and a target agent are traveling and learning a single agent policy that is based on the data associated with the multi-agent environment and that accounts for operation of at least one of: the ego agent and the target agent individually. The system and method also include learning a multi-agent policy that accounts for operation of the ego agent and the target agent with respect to one another within the multi-agent environment. The system and method further include controlling at least one of: the ego agent and the target agent to operate within the multi-agent environment based on the multi-agent policy.

20 Claims, 8 Drawing Sheets

(56) References Cited

OTHER PUBLICATIONS

T. Bansal, J. Pachocki, S. Sidor, I. Sutskever, and I. Mordatch, "Emergent complexity via multi-agent competition," arXiv preprint arXiv:1710.03748, 2017.
T. D. Barfoot, State estimation for robotics. Cambridge University Press, 2017.
Y. Bengio, J. Louradour, R. Collobert, and J. Weston, "Curriculum learning," in ICML, 2009.
S. Bhattacharya, M. Likhachev, and V. Kumar, "Multi-agent path planning with multiple tasks and distance constraints," in ICRA, 2010.
L. Busoniu, R. Babuska, and B. D. Schutter, "A comprehensive survey of multiagent reinforcement learning," IEEE SMC—Part C, 2008.
P. Christiano, Z. Shah, I. Mordatch, J. Schneider, T. Blackwell, J. Tobin, P. Abbeel, and W. Zaremba, "Transfer from simulation to real world through learning deep inverse dynamics model," arXiv preprint arXiv:1610.03518, 2016.
P. Dhariwal, C. Hesse, O. Klimov, et al., "Openai baselines," https://github.com/openai/baselines, 2017.
J. Foerster, G. Farquhar, T. Afouras, N. Nardelli, and S. Whiteson, "Counterfactual multi-agent policy gradients," arXiv preprint arXiv:1705.08926, 2017.
J. Hao and H. Leung, "Introducing decision entrustment mechanism into repeated bilateral agent interactions to achieve social optimality," AAMAS, 2015.
H. He, J. Boyd-Graber, K. Kwok, and H. D. III, "Opponent modeling in deep reinforcement learning," in ICML, 2016.
G. Indiveri, "Kinematic time-invariant control of a 2d nonholonomic vehicle," in CDC, 1999.
J. Kober, J. A. Bagnell, and J. Peters, "Reinforcement learning in robotics: A survey," IJRR, 2013.
J. Kong, M. Pfeiffer, G. Schildbach, and F. Borrelli, "Kinematic and dynamic vehicle models for autonomous driving control design." in IV, 2015.
M. Lanctot, V. Zambaldi, A. Gruslys, et al., "A unified game-theoretic approach to multiagent reinforcement learning," in NIPS, 2017.
S. Lefèvre, D. Vasquez, and C. Laugier. "A survey on motion prediction and risk assessment for intelligent vehicles". Robomech Journal, 2014.
J. Z. Leibo, V. Zambaldi, M. Lanctot, J. Marecki, and T. Graepel, "Multi-agent reinforcement learning in sequential social dilemmas," in AAMAS, 2017.
M. L. Littman, "Markov games as a framework for multi-agent reinforcement learning," in Machine Learning Proceedings, 1994.
R. Lowe, Y. Wu, A. Tamar, J. Harb, P. Abbeel, and I. Mordatch, "Multi-agent actor-critic for mixed cooperative-competitive environments," in NIPS, 2017.
P. Mathieu and J. Delahaye, "New winning strategies for the iterated prisoner's dilemma," in AAMAS, 2015.
V. Mnih, K. Kavukcuoglu, D. Silver, et al., "Human-level control through deep reinforcement learning," Nature, 2015.
B. Paden, M. Čáp, S. Yong, D. Yershov, and E. Frazzoli, "A survey of motion planning and control techniques for self-driving urban vehicles," IV, 2016.
M. Raghu, A. Irpan, J. Andreas, R. Kleinberg, Q. V. Le, and J. Kleinberg, "Can deep reinforcement learning solve erdos-selfridge-spencer games?" arXiv preprint arXiv:1711.02301, 2017.
T. Schaul, D. Horgan, K. Gregor, and D. Silver, "Universal value function approximators," in ICML, 2015.
J. Schulman, S. Levine, P. Abbeel, M. Jordan, and P. Moritz, "Trust region policy optimization," in ICML, 2015.
D. Schwab, Y. Zhu, and M. Veloso. "Zero shot transfer learning for robot soccer". In AAMAS, 2018.
D. Silver, A. Huang, C. J. Maddison, A. Guez, L. Sifre, G. V. D. Driessche, J. Schrittwieser, I. Antonoglou, V. Panneershelvam, M. Lanctot, et al., "Mastering the game of go with deep neural networks and tree search," Nature, 2016.
M. Tan, "Multi-agent reinforcement learning: Independent vs. cooperative agents," in ICML, 1993.
W. Wang, J. Hao, Y. Wang, and M. Taylor, "Towards cooperation in sequential prisoner's dilemmas: a deep multiagent reinforcement learning approach," arXiv preprint arXiv:1803.00162, 2018.
C. C. White III and D. J. White, "Markov decision processes," EJOR, 1989.

* cited by examiner

SYSTEM AND METHOD FOR MULTI-AGENT REINFORCEMENT LEARNING IN A MULTI-AGENT ENVIRONMENT

CROSS-REFERENCE TO RELATED APPLICATION

This application claims priority to U.S. Provisional Application Ser. No. 62/731,426 filed on Sep. 14, 2018, which is expressly incorporated herein by reference.

BACKGROUND

Multi-robot navigation and autonomous driving applications such as highway merging, four-way stops, and lane changing are examples of situations where interaction is required between multiple mobile agents. For example, two mobile agents may be attempting to make maneuvers that may cross each other's paths. Mobile agent models may be organized into physics-based models that assume that the agents' movement follow laws of physics, maneuver-based models that leverage prototype trajectories or maneuver intention estimation that is assumed to be executed independently from other mobile agents. However, these models do not include adapting to the behavior of time-varying stochastic agents.

BRIEF DESCRIPTION

According to one aspect, a computer-implemented method for multi-agent reinforcement learning in a multi-agent environment that includes receiving data associated with the multi-agent environment in which an ego agent and a target agent are traveling and learning a single agent policy that is based on the data associated with the multi-agent environment and that accounts for operation of at least one of: the ego agent and the target agent individually. The single agent policy is determined according to an individual goal-specific reward function. The computer-implemented method also includes learning a multi-agent policy that accounts for operation of the ego agent and the target agent with respect to one another within the multi-agent environment. The multi-agent policy is determined according to a modification of the individual goal-specific reward function to a cooperative goal-specific reward function. The computer-implemented method also includes controlling at least one of: the ego agent and the target agent to operate within the multi-agent environment based on the multi-agent policy.

According to another aspect, a system for multi-agent reinforcement learning in a multi-agent environment that includes a memory storing instructions when executed by a processor cause the processor to receive data associated with the multi-agent environment in which an ego agent and a target agent are traveling and learn a single agent policy that is based on the data associated with the multi-agent environment and that accounts for operation of at least one of: the ego agent and the target agent individually. The single agent policy is determined according to an individual goal-specific reward function. The instructions also cause the processor to learn a multi-agent policy that accounts for operation of the ego agent and the target agent with respect to one another within the multi-agent environment. The multi-agent policy is determined according to a modification of the individual goal-specific reward function to a cooperative goal-specific reward function. The instructions further cause the processor to control at least one of: the ego agent and the target agent to operate within the multi-agent environment based on the multi-agent policy.

According to an additional aspect, a non-transitory computer readable storage medium storing instructions that when executed by a computer, which includes a processor perform a method that includes receiving data associated with a multi-agent environment in which an ego agent and a target agent are traveling and learning a single agent policy that is based on the data associated with the multi-agent environment and that accounts for operation of at least one of: the ego agent and the target agent individually. The single agent policy is determined according to an individual goal-specific reward function. The computer-implemented method also includes learning a multi-agent policy that accounts for operation of the ego agent and the target agent with respect to one another within the multi-agent environment. The multi-agent policy is determined according to a modification of the individual goal-specific reward function to a cooperative goal-specific reward function. The computer-implemented method also includes controlling at least one of: the ego agent and the target agent to operate within the multi-agent environment based on the multi-agent policy.

DETAILED DESCRIPTION

Figure 1:
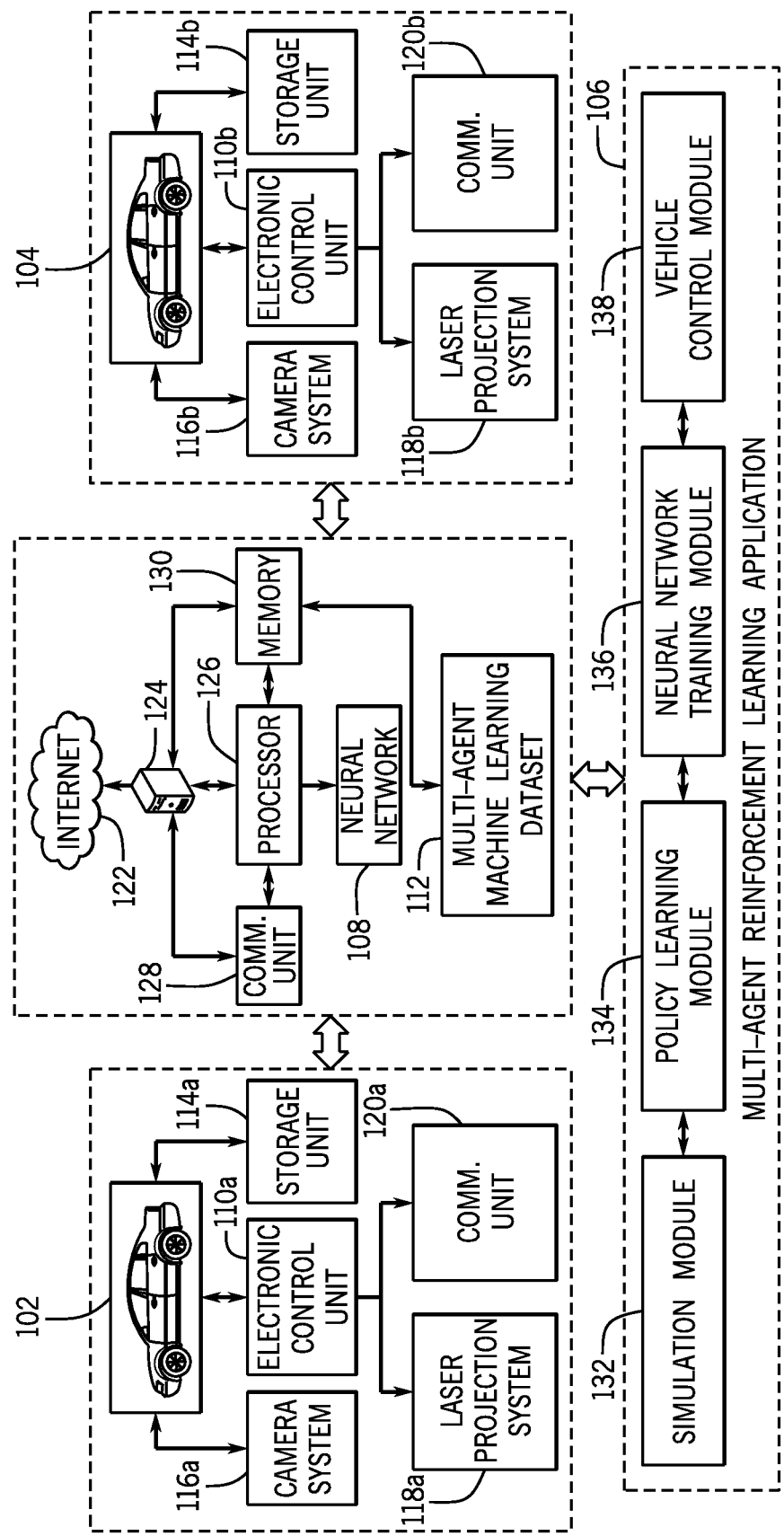
FIG. 1 is a schematic view of an exemplary system 100 for providing multi-agent reinforcement learning for vehicular navigation according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x" "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for providing multi-agent reinforcement learning for vehicular navigation according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego agent 102 and a target agent 104. For purposes of simplicity, this disclosure will describe the embodiments of the system 100 with respect to a single ego agent 102 and a single target agent 104. However, it is appreciated that the system 100 may include more than one ego agent 102 and more than one target agent 104 and that the embodiments and processes discussed herein may be utilized in an environment that includes one or more ego agents 102 and one or more target agents 104.

Figure 2:
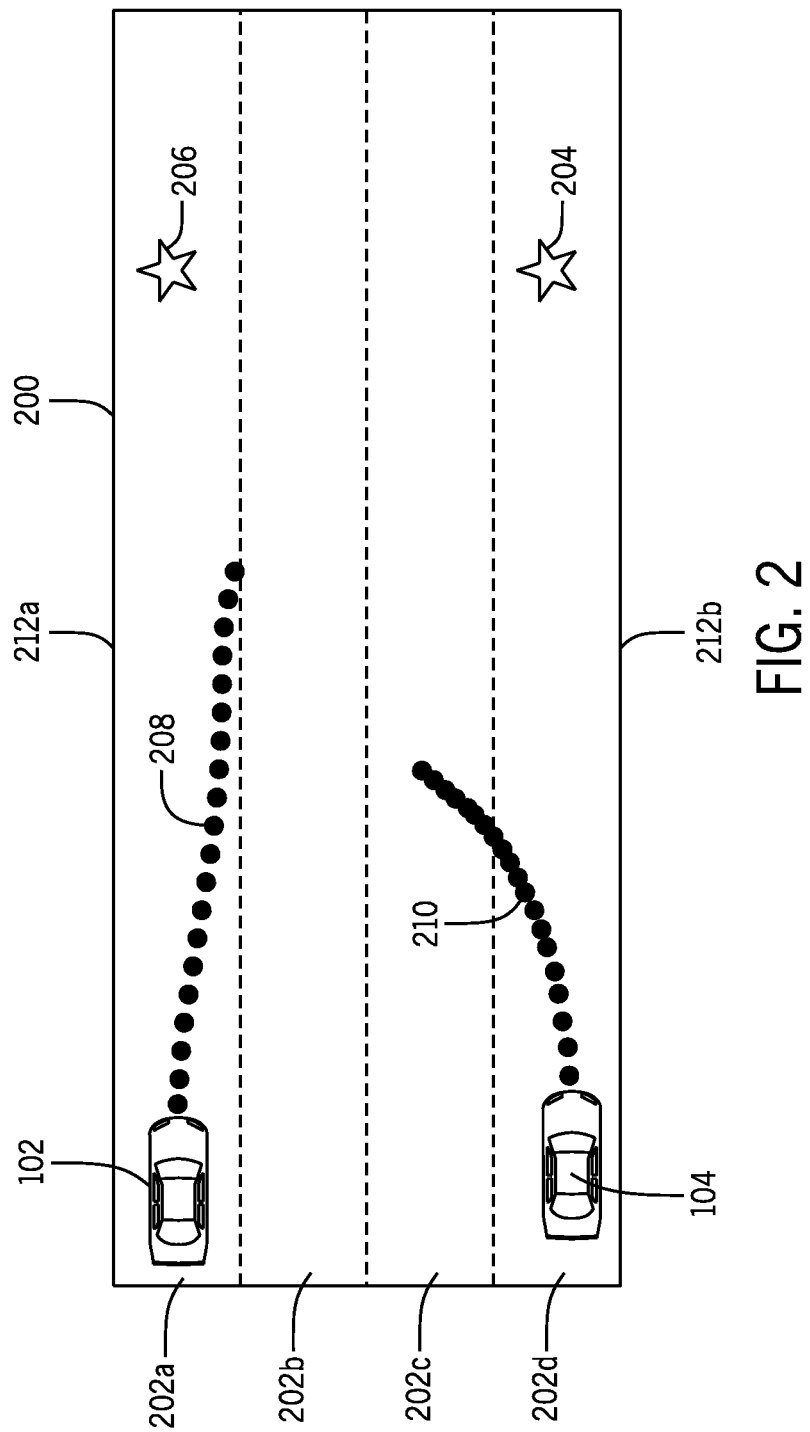
FIG. 2 is an illustrative example of an ego agent and a target agent traveling in a multi-agent environment according to an exemplary embodiment of the present disclosure.

As shown in the illustrative example of FIG. 2, the ego agent 102 and the target agent 104 may be traveling in a multi-agent environment 200. In particular, the ego agent 102 and the target agent 104 may be traveling within adjacent lanes of a roadway 202 of the multi-agent environment 200. The ego agent 102 and the target agent 104 may be traveling in respective directions and in locations that are within a particular distance of one another. As shown, the ego agent 102 may be traveling on the roadway 202 to reach a goal 204 (e.g., way point, destination) while the target agent 104 may be traveling on the roadway 202 to reach a goal 206 (e.g., way point, destination). In some instances, as shown, a path 208 of the ego agent 102 may potentially cross a path 210 of the target agent 104 as each of the agents 102, 104 are attempting to reach their respective goals 204, 206.

With reference FIG. 1 and FIG. 2, in an exemplary embodiment, the system 100 may include a multi-agent reinforcement learning application (multi-agent application) 106 that may be configured to leverage policy gradient algorithms to learn a multi-agent policy that is capable of being utilized to autonomously control the ego agent 102 and/or the target agent 104 to reach their respective goals 204, 206 while taking one another into account. As discussed below, the multi-agent application 106 may be configured to learn a single agent policy that is associated with the ego agent 102 using a single agent actor (SA) critic model (shown in FIG. 6).

The single agent policy may be determined based on one or more simulations of the multi-agent environment 200 using the single agent actor critic model. The one or more simulations may include one or more potential actions that may be performed by the ego agent 102 and/or the target agent 104 to independently reach their respective goals 204, 206 (while not taking into account any other agents within the environment 200). These independent actions may be evaluated within the single agent actor critic model by executing one or more iterations of a Markov Decision Process (MDP) where one or more critics evaluate one or more actions (output of actor models) taken by a virtual ego agent (shown in FIG. 4) and/or a virtual target agent (shown in FIG. 4) to determine one or more rewards and one or more states that are analyzed to learn respective single agent policies associated with the ego agent 102 and/or the target agent 104.

The multi-agent application 106 may thereby be configured to utilize a multi-agent actor critic model (shown in FIG. 6) to learn one or more multi-agent policies that account for the multiple agents that are traveling in respective directions within the multi-agent environment 200. The multi-agent actor critic model includes one or more iterations of Markov Games where one or more critics evaluate one or more actions (output of actor models) taken by the simulated ego agent and the simulated target agent to determine one or more rewards and one or more states related to a cooperative goal-specific reward function.

In one or more embodiments, the multi-agent application 106 may be configured to utilize a multi-stage approach to learn multiple interactive policies for multiple agents, including, but not limited to, the ego agent 102 and the target agent 104 that are traveling within the multi-agent environment 200. In particular, multi-agent actor critic data output from the multi-agent actor critic model may be combined with the single agent policy (e.g., output of the single agent actor critic model) to thereby learn a multi-agent policy that may be utilized to enable the ego agent 102 and/or the target agent 104 to be autonomously operated to reach their respective goals 204, 206 while accounting for one another within the multi-agent environment 200.

Stated differently, the application 106 may pass a state of the ego agent 102 and a state of the target agent 104 to actor and critic models. The application 106 may accordingly utilize a curriculum based learning approach that learns how to adapt single agent policies to learn multi-agent policies in order to provide multi-agent behaviors where the ego agent 102 and/or the target agent 104 learn a policy to simultaneously achieve respective goals 204, 206 without any conflict within the multi-agent environment 200. Accordingly, the multi-agent application 106 may be configured to utilize a multi-stage approach to learn multiple interactive policies for multiple agents, including, but not limited to, the ego agent 102 and the target agent 104 that are traveling within the multi-agent environment 200.

As discussed below, upon learning the single agent policies and the multi-agent policies, the multi-agent application 106 may be configured to train a neural network 108 with the multi-agent policies. As discussed below, the application 106 may communicate with the neural network 108 to receive multi-agent policy data that may be utilized to control autonomous operation (e.g., driving) of the ego agent 102 and/or the target agent 104 to thereby follow particular paths at a particular speed, acceleration rate, steering angle, deceleration rate, and the like while maneuvering within the multi-agent environment 200 to reach the respective goals 204, 206 without any conflict amongst one another. Accordingly, modified single agent policies (i.e., multi-agent policies) may be utilized by the application 106 to autonomously control the ego agent 102 and/or the target agent 104 within the multi-agent environment 200 and/or similar multi-agent environments that include similar driving scenarios to safely and efficiently navigate to their respective goals 204, 206.

In one or more configurations, the ego agent 102 and/or the target agent 104 may include, but may not be limited to, an automobile, a robot, a forklift, a bicycle, an airplane, a construction crane, and the like that may be traveling within one or more types of multi-agent environments. In one embodiment, the multi-agent environment 200 may include, but may not be limited to areas that are evaluated to provide navigable pathways for the ego agent 102 and/or the target agent 104 that are traveling on the roadway 202, as shown in the illustrative example of FIG. 2.

In additional embodiments, one or more multi-agent environments may include, but may not be limited to, additional types of roadways such as a narrow street or tunnel and/or a pathway that may exist within a confined location such as a factory floor, a construction site, or an airport taxiway. For purposes of simplicity, the exemplary embodiments and examples discussed herein will mainly be described with reference to the multi-agent environment 200 that includes the roadway, as shown in the illustrative example of FIG. 2. However, it is appreciated that the application 106 may be executed to be utilized in one or more additional multi-agent environments that may include the additional types of roadways, discussed above.

As discussed below, the multi-agent application 106 may determine a virtual simulated model of the multi-agent environment 200 in which the ego agent 102 and the target agent 104 and the respective goals 204, 206 are virtually represented at a discrete time step. The simulated model may be determined based on image data and/or LiDAR data that may be provided to the application 106 by one or more components of the ego agent 102 and/or the target agent 104. For example, the simulated model may include lanes 202a, 202d on which the ego agent 102 and the target agent 104 are traveling in addition to lanes 202b, 202c that fall between the lanes 202a, 202d on which the ego agent 102 and the target agent 104 are traveling.

As discussed below, the simulated model includes respective observations and respective goals that may be inputted into the single agent actor critic model to enable the application 106 to learn the single agent policy associated with the ego agent 102 and/or the target agent 104. Additionally, the respective observations and respective goals of the simulated model may be inputted into the multi-agent actor critic model that also uses a decentralized actor-critic policy gradient algorithm to enable the application 106 to output multi-agent actor critic data that may be combined with the single agent policy to learn the multi-agent policy. In other words, the multi-agent application 106 may combine the single agent policy associated with the ego agent 102 and/or the target agent 104 with the output of multi-agent actor critic model to learn a multi-agent policy that modifies the single agent value functions and policies to account for both agents 102, 104 (e.g., and other agents) within the multi-agent environment 200.

With continued reference to FIG. 1, the ego agent 102 and the target agent 104 may include respective electronic control devices (ECUs) 110a, 110b. The ECUs 110a, 110b may execute one or more applications, operating systems, vehicle system and subsystem executable instructions, among others. In one or more embodiments, the ECUs 110a, 110b may include a respective microprocessor, one or more application-specific integrated circuit(s) (ASIC), or other similar devices. The ECUs 110a, 110b may also include respective internal processing memory, an interface circuit, and bus lines for transferring data, sending commands, and communicating with the plurality of components of the ego agent 102 and/or the target agent 104.

The ECUs 110a, 110b may also include a respective communication device (not shown) for sending data internally to components of the respective agents 102, 104 and communicating with externally hosted computing systems (e.g., external to the agents 102, 104). Generally, the ECUs 110a, 110b communicate with respective storage units 114a, 114b to execute the one or more applications, operating systems, vehicle systems and subsystem user interfaces, and the like that are stored within the respective storage units 114a, 114b.

In some embodiments, the storage units 114a, 114b may respectively store single agent polices learned by the application 106 for each of the respective agents 102, 104 on the storage units 114a, 114b. Accordingly, the storage units 114a, 114b may be accessed by the application 106 to store the respective single agent policies learned by the application 106 to be followed by the respective agents 102, 104. In some embodiments, the storage units 114a, 114b may be accessed by the application 106 to retrieve the respective single agent policies learned by the application 106 to be combined with the multi-agent actor critic data output through the multi-agent actor critic model to learn the multi-agent policy to account for the presence of one another (e.g., other agents) within the multi-agent environment 200.

In an exemplary embodiment, the ECUs 110a, 110b may be configured to operably control the plurality of components of the respective agents 102, 104. The ECUs 110a, 110b may additionally provide one or more commands to one or more control units (not shown) of the agents 102, 104 including, but not limited to a respective engine control unit, a respective braking control unit, a respective transmission control unit, a respective steering control unit, and the like to control the ego agent 102 and/or target agent 104 to be autonomously operated.

In an exemplary embodiment, one or both of the ECU 110a, 110b may autonomously control the ego agent 102 and/or the target agent 104 based on one or more multi-agent policies that are learned by the application 106 and trained to the neural network 108. Accordingly, the application 106 may implement a multi-agent policy that includes a respective single agent policy from a previous stage of curriculum.

Referring again to FIG. 1, the respective storage units 114a, 114b of the ego agent 102 and the target agent 104 may be configured to store one or more executable files associated with one or more operating systems, applications, associated operating system data, application data, vehicle system and subsystem user interface data, and the like that are executed by the respective ECUs 110a, 110b. In one or more embodiments, the storage units 114a, 114b may be accessed by the multi-agent application 106 to store data, for example, one or more images, videos, one or more sets of image coordinates, one or more sets of LiDAR coordinates (e.g., LiDAR coordinates associated with the position of an object), one or more sets of locational coordinates (e.g., GPS/DGPS coordinates) and/or vehicle dynamic data associated respectively with the ego agent 102 and the target agent 104.

The ECUs 110a, 110b may be additionally configured to operably control respective camera systems 116a, 116b of the ego agent 102 and the target agent 104. The camera systems 116a, 116b may include one or more cameras that are positioned at one or more exterior portions of the respective agents 102, 104. The camera(s) of the camera systems 116a, 116b may be positioned in a direction to capture the surrounding environment of the respective agents 102, 104 that includes a predetermined area located around (front/sides/behind) the respective agents 102, 104 that the multi-agent environment 200.

In one or more configurations, the one or more cameras of the respective camera systems 116a, 116b may be disposed at external front, rear, and/or side portions of the respective agents 102, 104 including, but not limited to different portions of the bumpers, lighting units, fenders/body panels, and/or windshields. The one or more cameras may be positioned on a respective planar sweep pedestal (not shown) that allows the one or more cameras to be oscillated to capture images of the surrounding environments of the respective agents 102, 104.

With respect to the ego agent 102, the multi-agent application 106 may receive image data associated with untrimmed images/video of the surrounding environment of the ego agent 102 from the camera system 116a and may execute image logic to analyze the image data and determine ego agent image based observations associated with the multi-agent environment 200, one or more target agents 104 that may be located within the multi-agent environment 200, one or lanes 202a-202d (pathways) within the environment, and/or one or more objects (not shown) that may be located within the multi-agent environment 200.

With respect to the target agent 104, the multi-agent application 106 may receive image data associated with untrimmed images/video of the surrounding environment of the target agent 104 from the camera system 116b and may execute image logic to analyze the image data and determine target agent image based observations associated with the multi-agent environment 200, the ego agent 102 that may be located within the multi-agent environment 200, one or lanes 202a-202d (pathways) within the environment, and/or one or more objects (not shown) that may be located within the multi-agent environment 200.

In one or more embodiments, the ECUs 110a, 110b may also be operably connected to respective vehicle laser projection systems 118a, 118b that may include one or more respective LiDAR transceivers (not shown). The one or more respective LiDAR transceivers of the respective vehicle laser projection systems 118a, 118b may be disposed at respective external front, rear, and/or side portions of the respective agents 102, 104, including, but not limited to different portions of bumpers, body panels, fenders, lighting units, and/or windshields.

The one or more respective LiDAR transceivers may include one or more planar sweep lasers that include may be configured to oscillate and emit one or more laser beams of ultraviolet, visible, or near infrared light toward the surrounding environment of the respective agents 102, 104. The vehicle laser projection systems 118a, 118b may be configured to receive one or more reflected laser waves based on the one or more laser beams emitted by the LiDAR transceivers. The one or more reflected laser waves may be reflected off of one or more boundaries 212a, 212b (e.g., guardrails) of the multi-agent environment, and/or one or more objects (e.g., other agents, cones, pedestrians, etc.) that may be located within the multi-agent environment 200.

In an exemplary embodiment, the vehicle laser projection systems 118a, 118b may be configured to output LiDAR data associated to one or more reflected laser waves. With respect to the ego agent 102, the multi-agent application 106 may receive LiDAR data communicated by the vehicle laser projection system 118a and may execute LiDAR logic to analyze the LiDAR data and determine ego agent LiDAR based observations associated with the multi-agent environment 200, and more specifically the lane 202a on which the ego agent 102 is traveling, additional lanes 202b-202d included within the multi-agent environment 200, one or more target agents 104 that may be located within the multi-agent environment 200, one or more boundaries 212a, 212b of the multi-agent environment 200, and/or one or more objects that may be located within the multi-agent environment 200.

With respect to the target agent 104, the multi-agent application 106 may receive LiDAR data communicated by the vehicle laser projection system 118b and may execute LiDAR logic to analyze the LiDAR data and determine target agent LiDAR based observations associated with the multi-agent environment 200, and more specifically the lane 202d on which the target agent 104 is traveling, additional lanes 202a-202c included within the multi-agent environment 200, the ego agent 102 that may be located within the multi-agent environment 200, one or more boundaries 212a, 212b of the multi-agent environment 200, and/or one or more objects that may be located within the multi-agent environment 200.

In one or more embodiments, the ego agent 102 and the target agent 104 may additionally include respective communication units 120a, 120b that may be operably controlled by the respective ECUs 110a, 110b of the respective agents 102, 104. The communication units 120a, 120b may each be operably connected to one or more transceivers (not shown) of the respective agents 102, 104. The communication units 120a, 120b may be configured to communicate through an internet cloud 122 through one or more wireless communication signals that may include, but may not be limited to Bluetooth® signals, Wi-Fi signals, ZigBee signals, Wi-Max signals, and the like. In some embodiments, the communication unit 120a of the ego agent 102 may be configured to communicate via vehicle-to-vehicle (V2V) with the communication unit 120b of the target agent 104 to exchange information about the positon, speed, steering angles, acceleration rates, deceleration rates, and the like of the agents 102, 104 traveling within the multi-agent environment 200.

In one embodiment, the communication units 120a, 120b may be configured to connect to the internet cloud 122 to send and receive communication signals to and from an externally hosted server infrastructure (external server) 124. The external server 124 may host the neural network 108 and may execute the multi-agent application 106 to utilize processing power to implement learn the single agent policy, the multi-agent policy, and to thereby train the neural network 108 with one or more multi-agent policies. In an alternate embodiment, the neural network 108 may be trained with one or more single agent policies in addition to one or more multi-agent policies.

In particular, the neural network 108 may be trained at one or more time steps based on learning of one or more multi-agent policies that are associated with the ego agent 102 and/or the target agent 104 that are traveling within the multi-agent environment 200. The training of the neural network 108 may allow the agents 102, 104 to receive data pertaining to real-time or similar multi-agent scenarios (e.g., ego agent 102 and target agent 104 located with respect to one another) that may occur within a multi-agent environment 200 to ensure that a policy is learned that may utilized by the ego agent 102 and/or the target agent 104 to simultaneously achieve respective goals 204, 206 in a cooperative non-conflicting manner while accounting for one another within the multi-agent environment 200.

In an exemplary embodiment, components of the external server 124 including the neural network 108 may be operably controlled by a processor 126. The processor 126 may be configured to operably control the neural network 108 to utilize machine learning/deep learning to provide artificial intelligence capabilities that may be utilized to build a multi-agent machine learning dataset 112.

With continued reference to the external server 124, the processor 126 may be operably connected to a memory 130. The memory 130 may store one or more operating systems, applications, associated operating system data, application data, executable data, and the like. In one embodiment, the processor 126 may be configured to process information derived from one or more multi-agent policies learned by the application 106 at one or more time steps that may be utilized to train the neural network 108 by updating the multi-agent machine learning dataset 112 stored on the memory 130.

In one or more embodiments, the multi-agent machine learning dataset 112 may be configured as a dataset that includes one or more fields associated with each of the ego agent 102 and the target agent 104 with travel pathway geo-location information associated with one or more perspective pathways and vehicle dynamics data associated with particular speeds, acceleration rates, steering angles, deceleration rates, and the like that may be determined to be utilized by the ego agent 102 and/or the target agent 104 to reach the respective goals 204, 206 based on the learned multi-agent policy.

In one embodiment, the processor 126 of the external server 124 may additionally be configured to communicate with a communication unit 128. The communication unit 128 may be configured to communicate through the internet cloud 122 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 122 to send and receive communication signals to and from the ego agent 102 and/or the target agent 104. In particular, the external server 124 may receive image data and LiDAR data that may be communicated by the ego agent 102 and/or the target agent 104 based on the utilization of one or more of the camera systems 116a, 116b and the vehicle laser projection systems 118a, 118b. As discussed below, such data may be utilized to determine simulated multi-agent environment that pertains to the real-world multi-agent environment 200 and is used within the single agent actor critic model and the multi-agent actor critic model.

II. The Multi-Agent Reinforcement Learning Application, Related Methods, and Illustrative Policy Results Examples The components of the multi-agent application 106 will now be described according to an exemplary embodiment and with reference to FIG. 1. In an exemplary embodiment, the multi-agent application 106 may be stored on the memory 130 and executed by the processor 126 of the external server 124. In another embodiment, the multi-agent application 106 may be stored on the storage unit 114a of the ego agent 102 and may be executed by the ECU 110a of the ego agent 102. In some embodiments, in addition to be stored and executed by the external server 124 and/or by the ego agent 102, the application 106 may also be executed by the ECU 110b of the target agent 104.

The general functionality of the multi-agent application 106 will now be discussed. In an exemplary embodiment, the multi-agent application 106 may include a simulation module 132, a policy learning module 134, a neural network training module 136, and a vehicle control module 138. However, it is to be appreciated that the multi-agent application 106 may include one or more additional modules and/or sub-modules that are included in addition to the modules 132-138. Methods and examples describing process steps that are executed by the modules 132-138 of the multi-agent application 106 will now be described in more detail.

Figure 3:
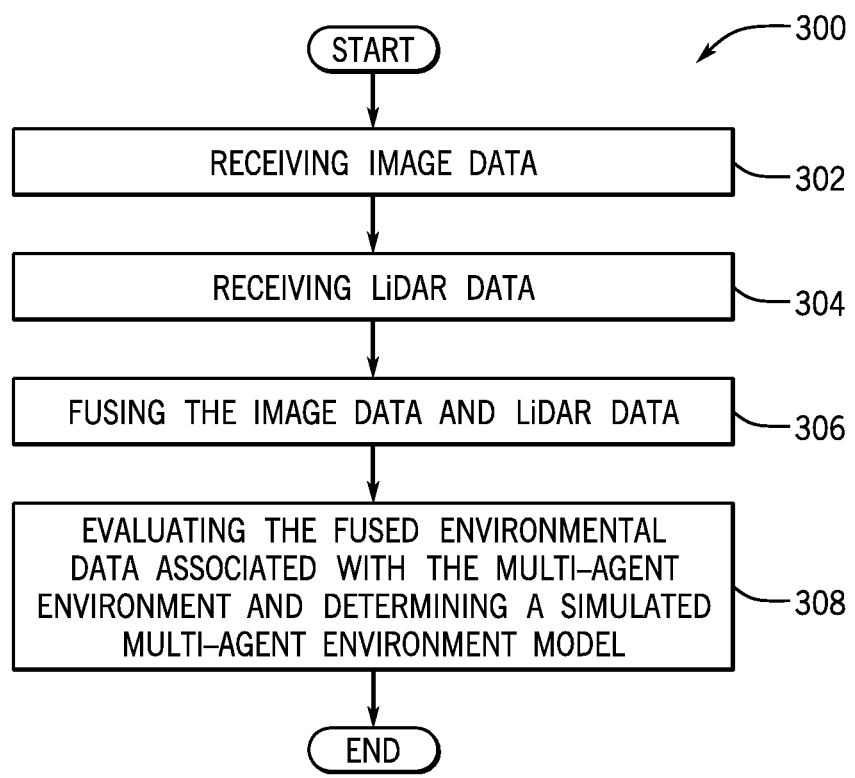
FIG. 3 is a process flow diagram of a method for receiving data associated with the multi-agent environment in which the ego agent and the target agent are traveling and processing a simulated multi-agent environment model which virtually represents the multi-agent environment according to an exemplary embodiment of the present disclosure.

FIG. 3 is a process flow diagram of a method 300 for receiving data associated with the multi-agent environment 200 in which the ego agent 102 and the target agent 104 are traveling and processing a simulated multi-agent environment model (simulated model) which virtually represents the multi-agent environment 200 according to an exemplary embodiment of the present disclosure. FIG. 3 will be described with reference to the components of FIG. 1, FIG. 2, and FIG. 4, though it is to be appreciated that the method of FIG. 3 may be used with other systems/components.

As discussed above, the simulated model may be determined by the application 106 as a virtual representation (e.g., virtual model) of the multi-agent environment 200 to be utilized within the single agent actor critic model and the multi-agent actor critic model. In particular, the simulated model may be determined by the application 106 as a virtual world model of the real-world multi-agent environment 200 that is utilized when executing one or more iterations of Markov games to learn the single agent policy and multi-agent policy associated with the ego agent 102 and/or the target agent 104.

In an exemplary embodiment, the method 300 may begin at block 302, wherein the method 300 may include receiving image data. In one embodiment, the simulation module 132 may communicate with the camera system 116a of the ego agent 102 and/or the camera system 116b of the target agent 104 to collect untrimmed images/video of the surrounding environment of the agents 102, 104. The untrimmed images/video may include a 360 degree external views of the surrounding environments of the agents 102, 104 that includes the multi-agent environment 200.

With reference to the illustrative example of FIG. 2, from the perspective of the ego agent 102, such views may include observations of the ego agent 102 that include the target agent 104, the goal 204 of the ego agent 102, lanes 202a-202d included within the multi-agent environment 200, and boundaries 212a, 212b of the multi-agent environment 200. Additionally, from the perspective of the target agent 104, such views may include observations of the target agent 104 that include the ego agent 102, the goal 206 of the target agent 104, lanes 202a-202d included within the multi-agent environment 200, and boundaries 212a, 212b of the multi-agent environment 200. In one embodiment, the simulation module 132 may package and store the image data received from the camera system 116a and/or the image data received from the camera system 116b on the memory 130 of the external server 124 to be further evaluated by the simulation module 132.

The method 300 may proceed to block 304, wherein the method 300 may include receiving LiDAR data. In an exemplary embodiment, the simulation module 132 may communicate with the vehicle laser projection system 118a of the ego agent 102 and/or the vehicle laser projection system 118b of the target agent 104 to collect LiDAR data that includes LiDAR based observations from the ego agent 102 and/or the target agent 104. The LiDAR based observations may indicate the location, range, and positions of the one or more objects off which the reflected laser waves were reflected with respect to a location/position of the respective agents 102, 104.

With reference again to FIG. 2, from the perspective of the ego agent 102, the simulation module 132 may communicate with the vehicle laser projection system 118a of the ego agent 102 to collect ego agent LiDAR based observations that classifies sets of LiDAR coordinates that are associated with the target agent 104, the goal 204 of the ego agent 102 and boundaries 212a, 212b of the multi-agent environment 200. Additionally, from the perspective of the target agent 104, the simulation module 132 may communicate with the vehicle laser projection system 118b of the target agent 104 to collect target agent LiDAR based observations that classifies sets of LiDAR coordinates that are associated with the ego agent 102, the goal 206 of the ego agent 102 and boundaries 212a, 212b of the multi-agent environment 200. In one embodiment, the simulation module 132 may package and store the ego agent LiDAR based observations received from the vehicle laser projection system 118a and/or the target agent LiDAR based observations received from the vehicle laser projection system 118b on the memory 130 of the external server 124 to be further evaluated by the simulation module 132.

The method 300 may proceed to block 306, wherein the method 300 may include fusing the image data and LiDAR data. In an exemplary embodiment, the simulation module 132 may communicate with the neural network 108 to provide artificial intelligence capabilities to conduct multi-modal fusion of the image data received from the camera system 116a of the ego agent 102 and/or the camera system 116b of the target agent 104 with the LiDAR data received from the vehicle laser projection system 118a of the ego agent 102 and/or the vehicle laser projection system 118b of the target agent 104. The simulation module 132 may aggregate the image data and the LiDAR data into fused environmental data that is associated with the multi-agent environment 200 to be evaluated further by the module 132.

As an illustrative example, the simulation module 132 may communicate with the neural network 108 to provide artificial intelligence capabilities to utilize one or more machine learning/deep learning fusion processes to aggregate the image data received from the camera system 116a of the ego agent 102 and the image data received from the camera system 116b of the target agent 104 into aggregated image data. Accordingly, the ego agent image based observations of the multi-agent environment 200 may be aggregated with the target agent image based observations of the multi-agent environment 200.

The simulation module 132 may also utilize the neural network 108 to provide artificial intelligence capabilities to utilize one or more machine learning/deep learning fusion processes to aggregate the LiDAR data received from the vehicle laser projection system 118a of the ego agent 102 and the LiDAR data received from the vehicle laser projection system 118a of the target agent 104 into aggregated LiDAR data. Accordingly, the ego agent LiDAR based observations of the multi-agent environment 200 may be aggregated with the target agent LiDAR based observations of the multi-agent environment 200. The simulation module 132 may additionally employ the neural network 108 to provide artificial intelligence capabilities to utilize one or more machine learning/deep learning fusion processes to aggregate the aggregated image data and the aggregated LiDAR data into fused environmental data.

The method 300 may proceed to block 308, wherein the method 300 may include evaluating the fused environmental data associated with the multi-agent environment 200 and determining a simulated multi-agent environment model. In an exemplary embodiment, the simulation module 132 may communicate with the neural network 108 to utilize one or more machine learning/deep learning fusion processes to evaluate the fused environmental data to determine one or more sets of environmental coordinates that are based on the aggregated observations of the ego agent 102 and the target agent 104. The one or more sets of environmental coordinates may include positional coordinates (e.g., x, y grid world coordinates) that represent the ego agent 102, the target agent 104, the boundaries of the multi-agent environment 200, respective goals 204, 206 associated with the ego agent 102 and the target agent 104 (defined based on the source of the image data and/or the LiDAR data), and lanes on which the ego agent 102 and the target agent 104 may travel within the multi-agent environment 200 to be utilized to process the simulated environment.

The one or more sets of environmental coordinates may thereby define a simulated model (e.g., virtual grid world) that is representative of the real-world multi-agent environment 200 that includes the ego agent 102 and the target agent 104 and may be utilized to execute one or more iterations of Markov games to learn the single agent policies and multi-agent policies associated with the ego agent 102 and the target agent 104. As discussed below, the simulated model includes a virtual ego agent that represents the ego agent 102 and a virtual target agent that represents the target agent 104 along with virtual markers that may represent respective goals 204, 204, lanes 202a-202d on a roadway of the multi-agent environment 200, and the boundaries 212a, 212b of the multi-agent environment 200.

In an exemplary embodiment, upon determining the simulated model (at block 308 of the method 300), the simulation module 132 may communicate data pertaining to the simulated model to the policy learning module 134. The policy learning module 134 may thereby utilize the simulated model to execute one or more iterations of Markov games to learn the single agent policies and multi-agent policies associated with the ego agent 102 and the target agent 104.

Figure 4:
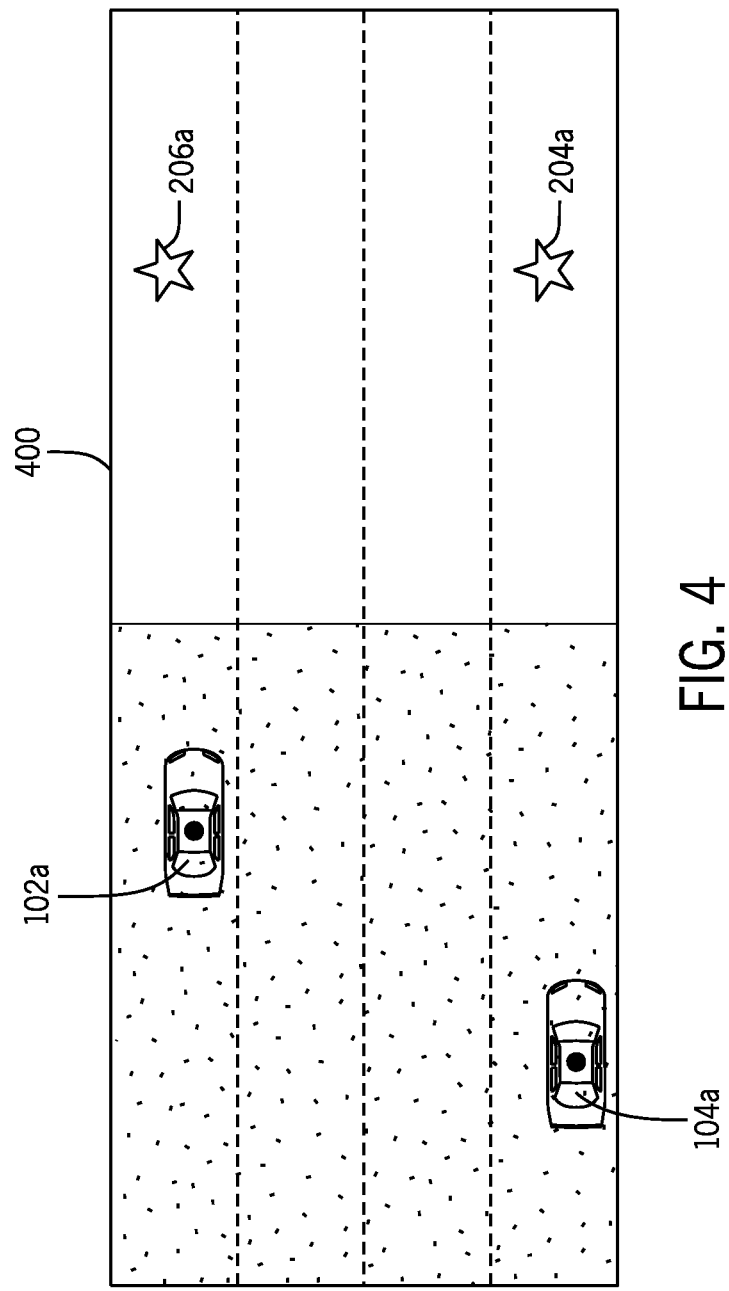
FIG. 4 includes an illustrative example of the simulated model which virtually represents the multi-agent environment according to an exemplary embodiment of the present disclosure.

FIG. 4 includes an illustrative example of the simulated model 400 which virtually represents the multi-agent environment 200 according to an exemplary embodiment of the present disclosure. The simulated model 400 may be processed by the simulation module 132 of the multi-agent application 106 based on the execution of the method 300, as discussed above. In one embodiment, the simulated model 400 may include a simulated virtual model of the ego agent 102 that is provided as a virtual ego agent 102a that is presented in a respective location of a simulated model that replicates the real-world surrounding environment of the ego agent 102 within the multi-agent environment 200. The simulated model 400 may also include a virtual model of the target agent 104 that is provided as a virtual target agent 104a that is presented in a respective location of a simulated model 400 that replicates the real-world location of the target agent 104 within the multi-agent environment 200.

As shown in FIG. 4, the respective goals 204, 206 of the ego agent 102 and the target agent 104 may also be virtually represented within the simulated model 400 as respective virtual goals 204a, 206a. In one or more embodiments, the simulated model 400 may be utilized during one or more executions of the Markov Games with respect to the virtual ego agent 102a representing the real-world ego agent 102 and the virtual target agent 104a representing the real-world target agent 104 to learn one or more single agent polices and multi-agent policies that are associated with the ego agent 102 and/or the target agent 104.

In some embodiments, the simulated model 400 may also include vehicle dynamic data points (not shown) that may be interpreted by the application 106. The vehicle dynamic data points may be represented as a vector with real values parameters that are respectively associated with the virtual ego agent 102a and the virtual target agent 104a. With respect to the virtual ego agent 102a, the real value parameters may correspond to the speed of the virtual ego agent 102a, the steering angle of the virtual ego agent 102a, the acceleration rate of the virtual ego agent 102a, the deceleration rate of the virtual ego agent 102a, and the like. Similarly, with respect to the virtual target agent 104a, the real value parameters may correspond to the speed of the virtual target agent 104a, the steering angle of the virtual target agent 104a, the acceleration rate of the virtual target agent 104a, the deceleration rate of the virtual target agent 104a, and the like. In one embodiment, these real value parameters may be adjusted for the ego agent 102 and/or the target agent 104 based on the training of the neural network 108 to thereby allow the ego agent 102 and the target agent 104 to reach their respective goals 204, 206 without any conflict amongst one another.

Figure 5:
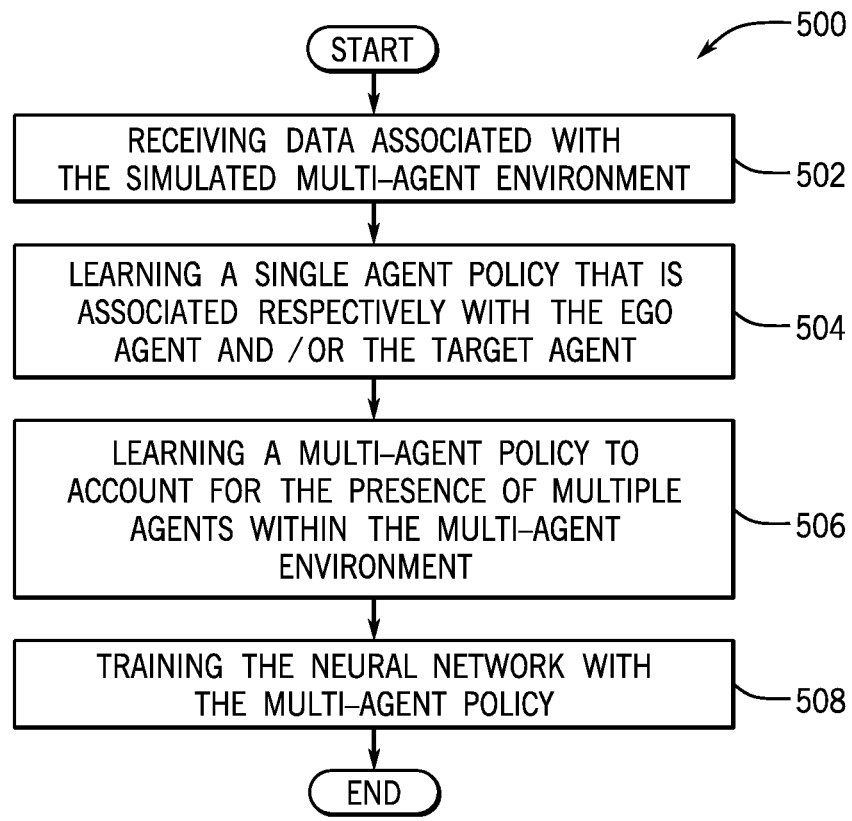
FIG. 5 is a process flow diagram of a method of learning a single agent policy and a multi-agent policy according to an exemplary embodiment of the present disclosure.

FIG. 5 is a process flow diagram of a method 500 of learning a single agent policy and a multi-agent policy according to an exemplary embodiment of the present disclosure. FIG. 5 will be described with reference to the components of FIG. 1, FIG. 2, and FIG. 4, though it is to be appreciated that the method of FIG. 5 may be used with other systems/components. The method 500 may begin at block 502, wherein the method 500 may include receiving data associated with the simulated model 400. In an exemplary embodiment, the simulation module 132 of the multi-agent application 106 may communicate data associated with the simulated model 400 to the policy learning module 134. The policy learning module 134 may evaluate the data and may determine observations associated with the multi-agent environment from the perspective of the ego agent 102 and the target agent 104.

In particular, the policy learning module 134 may evaluate the data associated with the simulated model 400 and may determine the goal of the ego agent 102, a lane 202a on which the ego agent 102 is traveling, additional lanes 202b-202d of the roadway on which the ego agent 102 is traveling, boundaries of the multi-agent environment 200, and the like. Additionally, the policy learning module 134 may evaluate the data associated with the simulated model 400 and may determine the goal of the target agent 104, a lane 202d on which the target agent 104 is traveling, additional lanes 202a-202c of the roadway on which the target agent 104 is traveling, boundaries of the multi-agent environment 200, and the like.

The policy learning module 134 may utilize such data to perform one or more executions of the Markov Games with respect to the virtual ego agent 102a representing the real-world ego agent 102 and the virtual target agent 104a representing the real-world target agent 104 to learn the single agent policy and the multi-agent policy that are associated with the ego agent 102 and/or the target agent 104. Accordingly, the simulated model 400 may be utilized to simulate one or more potential actions that may be performed by the virtual ego agent 102a and/or the virtual target agent 104a to independently reach their respective virtual goals 204a, 206a irrespective of one another. These independent actions may be evaluated using a Markov Decision Process (MDP) within the single agent actor-critic model where one or more critics evaluate one or more actions (output of actor models) taken by the virtual ego agent 102a and the virtual target agent 104a to determine one or more rewards and one or more states that are utilized to learn respective single agent policies.

The method 500 may proceed to block 504, wherein the method 500 may include learning a single agent policy that is associated respectively with the ego agent 102 and/or the target agent 104. In an exemplary embodiment, upon evaluating the data associated with the simulated model 400 and determining the virtual goals 204a of the virtual ego agent 102a, the lanes 202s-202d of the roadway on which the virtual ego agent 102a and the virtual target agent 104a are traveling, boundaries of the multi-agent environment 200, and the like, the policy learning module 134 may thereby learn the single agent policy for one or both of the ego agent 102 and the target agent 104 by inputting the observations of the ego agent 102 and/or the target agent 104 according to the model 400 and the respective goals 204, 206 into the single agent actor critic model (represented in FIG. 6).

In one or more embodiments, the policy learning module 134 may model the virtual ego agent 102a and/or the virtual target agent 104a and their respective virtual goals 204a, 206a as a Markov Decision Process (MDP) with goals that are executed within one or more iterations of the single agent actor critic model. Accordingly, the module 134 may run one or more iterations of MDP with goals and may learn a critic model from rewards based on individual goal-specific reward functions utilized for the virtual ego agent 102a and/or the virtual target agent 104a to achieve their independent virtual goals 204a, 206a without explicit regard for the presence of one another. Accordingly, the MDP may be learned by leveraging a policy gradient algorithm to train actor-critic models for the ego agent 102 and/or the target agent 104 to reach their respective goals 204, 206 using the individual reward functions and independent of one another.

In one configuration, each execution of the Markov Decision Process (e.g., MDP) may be defined as a tuple $<s, o, A, P, R, G, g, \gamma>$ in which $s$ represents a state of the world, $o$ represents the observations respectively associated with the ego agent 102 and/or the target agent 104, A represents a set of actions conducted by the virtual ego agent 102a or the virtual target agent 104a, P: $s \times A \rightarrow s$ determines the distribution over next states, G is the respective agents virtual goal 204a, 206a, and $g$ is the goal distribution. Additionally, R: $s \times g \times A \rightarrow \mathbb{R}$ is an (intermediate) individual goal-specific reward function, and $\gamma \in [0,1]$ is a discount factor. Accordingly, to learn the single learning policy associated with the ego agent 102 and/or the target agent 104, the virtual ego agent 102a and/or the virtual target agent 104a may thereby receive a reward R: $s \times g \times A \rightarrow \mathbb{R}$ to find a solution to the MDP which is conditioned on respective observations and virtual goals 204a, 206a as provided by the simulation module 132.

In one embodiment, during each execution of the Markov Decision Process (e.g, MDP) for the ego agent 102 and/or the target agent 104, the solution to the MDP is $\pi_\theta$: $o \times g \times A \rightarrow [0,1]$ where $\theta$ is the parameters of the policy. The policy learning module 134 may thereby execute the Markov Decision Process at one or more iterations to learn the single agent policy $\pi_{single}$ respectively for the ego agent 102 and/or the target agent 104 that is based on the output of the single agent actor critic model which maximizes the expected future discounted reward $R_t = \Sigma T_{t=0}^T \gamma^t r_t$ for the virtual ego agent 102a and/or the virtual target agent 104a within the simulated model.

Figure 6:
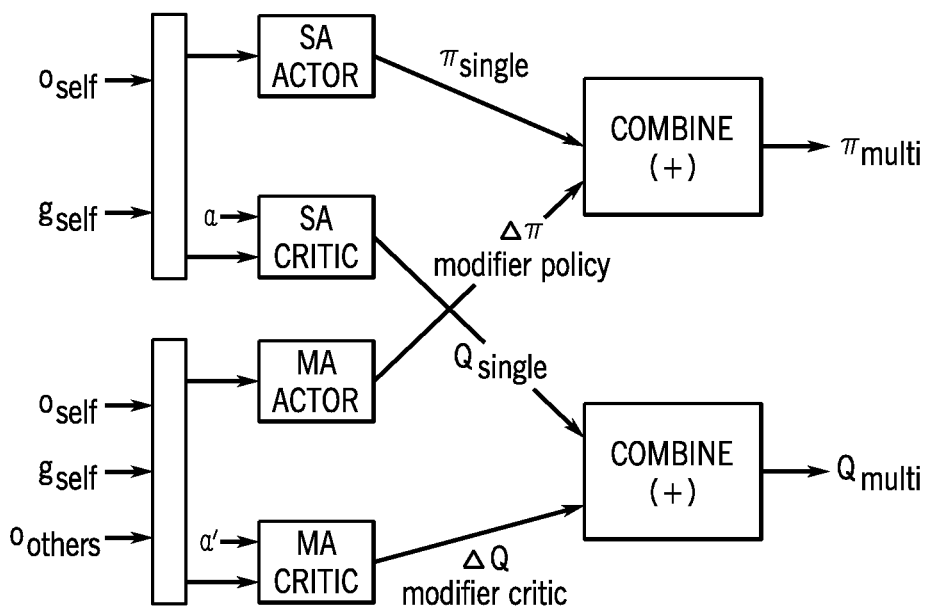
FIG. 6 is an illustrative example of an output of single agent actor critic model and a multi-agent actor critic model being combined to learn the multi-agent policy according to an exemplary embodiment of the present disclosure.

Accordingly, the policy learning module 134 may execute an actor-critic policy gradient algorithm to learn the single agent policy $\pi_{single}$ associated with the ego agent 102 and/or the target agent 104. Stated differently, the policy learning module 134 learns a single agent policy that may be respectively associated with the ego agent 102 and/or the target agent 104 based on the reception of respective observations and virtual goals 204a, 206a as inputs and respective actions (e.g., pathways, speed, acceleration rate, deceleration rate, steering angle, etc.) that the ego agent 102 and/or the target agent 104 should independently take/utilize (not taking into account one another) as outputs. In FIG. 6, the policy $\pi$ provides the actions that each agent 102, 104 should execute in the current world state, and critic Q provides how good the action is in the current world state.

More specifically, the module 134 may learn the respective single agent policies based on the respective reward R: $s \times g \times A \rightarrow \mathbb{R}$ received by the virtual ego agent 102a and/or the virtual target agent 104 in the absence of one another and which is conditioned on independent observations and virtual goals 204a, 206a. The decentralized actor critic policy gradient utilized within the single agent actor critic model maximizes $J_{sng}(\theta) = E_{o_s \sim p_s^\pi, a_s \sim \pi_{sng}, g_s \sim g}[R_{sng}]$ by ascending the following gradient:

$$\nabla_\theta J(\theta) = \underset{\tau \sim p_\theta(t), g_s \sim g}{E}[\nabla_\theta \log \pi_{sng}(a_s \mid o_s, g_s) A^\pi(a_s, o_s, g_s)]$$

where $p_s^\pi$ is the state distribution, and $A^\pi$ is the is the advantage function. As used herein, $\tau \sim p_\theta(\tau)$ refers to $o_s \sim p_s^\pi$, $a_s \sim \pi_{sng}$ where s is a subscript that designates "self" and "sng" is a subscript that designates a single agent scenario.

The policy learning module 134 may accordingly learn single agent policy $\pi_{sng}(a_s|o_s, g_s)$ which is based on respective individual goal-specific reward functions $R_{sng}(s_s, a_s, g_s)$ in the absence of other agents with the ego agent 102 corresponding to the virtual ego agent 102a and/or the target agent 104 corresponding to the virtual target agent 104. As discussed below, the learned signal agent policy $\pi_{sng}(a_s|o_s, g_s)$ may be further combined with multi-agent actor critic data $\Delta_\pi$ that is output by the multi-agent actor critic model that enables the policy learning module 134 to learn the multi-agent policy associated with the ego agent 102 and/or the target agent 104 as an interactive policy that enables the one or both agents 102, 104 to account for one another while traveling to their respective goals 204, 206 within the multi-agent environment 200.

The method 500 may proceed to block 506, wherein the method 500 may include learning a multi-agent policy to account for the presence of multiple agents 102, 104 within the multi-agent environment 200. In one configuration, the policy learning module 134 may evaluate the single agent policy respectively associated with the ego agent 102 and/or the target agent 104 and may pass inputs passed to the single agent actor critic model through the multi-agent actor critic model. In particular, each agent's own observations and goals may be passed to the multi-agent actor critic model. Additionally, estimated observations of one another (estimated observations of other agents in the multi-agent environment 200) such as estimated observations of the ego agent 102 from the perspective of the target agent 104 and estimated observations of the target agent 104 from the perspective of the ego agent 102 may be inputted to the multi-agent actor critic model.

In one embodiment, within the multi-agent actor critic model, one or more iterations of the Markov Game modified to accommodate mixed goals represented by the virtual goals 204a, 206a. The policy learning module 134 may model the virtual ego agent 102a and/or the virtual target agent 104a and their virtual goals 204a, 206a as the tuple: $<N, s, \{O_i\}_{i \in N}, \{A^i\}_{i \in N}, \{R_i\}b_{i \in N}, \{G_i\}_{i \in N}, P, g, \gamma>$ with N agents (e.g., N=2 that represent the ego agent 102 and the target agent 104). The possible configurations of the agents is specified by $s$. Additionally, the respective observations of ego agent 102 and the target agent 104 may be represented as $o_i \in O_i$ for each agent i which includes each respective agents observation of its own state $o_s$ (own agents speed, position, angular velocity, distance from agent to the respective goal 204 or 206) and an estimation of the other agent's state $o_o$ (e.g., estimations of the state of the target agent 104 by the ego agent 102 and estimations of the state of the ego agent 102 by the target agent 104) (e.g., other agent's speed, position, heading, angular velocity) which are passed through the multi-agent actor critic model.

Accordingly, within each iteration of the Markov Game with mixed goals, the virtual ego agent 102a and the virtual target agent 104a each respectively have their own set of discrete actions $A_i$ (e.g., speed, acceleration rate, deceleration rate, steering angle, etc.) that may be utilized with their respective observations of the ego agent's and/or the target agent's own state and estimations of the state of the other agent 102, 104. Each virtual agent 102a, 104a may accordingly be associated with respective virtual goals 204a, 206a $G_i \sim g$ and may be assigned a reward $R_i$: $s \times g \times A_i \to \mathbb{R}$.

The Markov Game includes a transition function P: $s \times A_1 \times x A_N \to s$ which determines a distribution over next states. The solution to the Markov Game for agent i is $O_i \times g \times A_i \to [0,1]$ where $\theta_i$ is the parameters of the multi-agent policy for agent i. Accordingly, the module 134 may attempt to learn respective policies $\pi_{\theta_i}$ for the ego agent 102 and/or the target agent 104 that may maximize their own expected future discounted reward $$R_i = \sum_{t=0}^{T} \gamma^t r_{it}.$$

The policy learning module 134 allows leveraging of each agent's learned single agent actor critic model in the form of respective single agent policies that may be frozen and combined with the multi-agent actori critic data output by the multi-agent actor critic model to learn the multi-agent policy associated with the ego agent 102 and/or the target agent 104 that allows the agents 102, 104 to account for one another within the multi-agent environment 200. As represented within the illustrative example of FIG. 6, the single agent policy for each agent 102 $\pi_{single}$ and the output of the multi-agent actor critic model $\Delta_\pi$ may be combined based on a summation to learn the multi-agent policy $\pi_{multi}$ that is associated respectively with the ego agent 102 and/or the target agent 104. In other words, the multi-agent policy is learned as a result of a modification of single agent value functions to account for other agents within the multi-agent environment 200. In FIG. 6, the policy π provides the actions that the agents 102, 104 should execute in the current world state, and critic Q provides how good the action is in the current world state.

The respective multi-agent policies may include data that pertains to respective position, speeds, acceleration rates, deceleration rates, steering angles, and the like that may be utilized by the ego agent 102 and/or the target agent 104 to reach their respective goals 204, 206 while cooperating with one another and ensuring non-conflicting behavior.

Stated differently, the policy learning module 134 may thereby learn multi-agent policies respectively associated with the ego agent 102 and the target agent 104 by modifying the virtual ego agent's individual goal-specific reward function $R_{sng}$ and policies (i.e., single agent policies) to account for the presence of the virtual target agent 104a within the simulated model 400. Additionally, the module 134 may modify the virtual target agent's individual goal-specific reward function $R_{sng}$ to a cooperative goal-specific reward function to account for the presence of the virtual ego agent 102a within the simulated model 400. Accordingly, the single agent policies associated with the ego agent 102 and the target agent 104 may be combined with the output of the multi-agent actor critic model to modify the single agent value functions to account for the other agents and thereby train the neural network 108 accordingly. It is to be appreciated that the single agent reward may be modified for the ego agent 102 and the target agent 104 to also account for N additional agents (N nearest neighbors) that may be present within the multi-agent environment 200. However, for purposes of simplicity this disclosure is describing the modification of the single agent polices associated with the ego agent 102 and the target agent 104 to account for one another.

By modifying each agent's individual goal-specific reward function $R_{sng}$ to the cooperative goal-specific reward function to account for the presence of other agent(s) within the multi-agent environment 200 within the Markov Game, the virtual ego agent 102a and the virtual target agent 104a are individually rewarded based on reaching their individual virtual goals 204a, 206a while being punished if they get into conflicts (e.g., if the virtual ego agent 102a intersects and impedes the virtual target agent 104b, if the virtual target agent 104a intersects and impedes the virtual ego agent 102a). Accordingly, the policy learning module 134 utilizes a new reward function respectively for the virtual ego agent 102a and the virtual target agent 104a where C is a positive constant that penalizes the respective virtual agents 102a, 104a for conflicts and $1_{conflict}(s_s, s_o)$ determines if conflict is present: $R_{mlt}(s_s, a_s, g_s, s_o) = R_{sng}(s_s, a_s, g_s) - C \times 1_{conflict}(s_s, s_o)$.

The policy learning module 134 uses a decentralized actor-critic policy gradient algorithm to learn the multi-agent policy associated with the ego agent 102 and/or the target agent 104. The module 134 thereby learns an actor critic model that accounts for the multiple agents (both the ego agent 102 and the target agent 104) within the multi-agent environment 200. More specifically, the multi-agent actor critic model receives inputs as observations $o_s$ (agent's own observation), estimations $o_o$ (agent's estimations of others' state), and goals $g_s$ (agent's own goal), and outputs one or more actions $a_s$ (e.g., pathways, speed, acceleration rate, deceleration rate, steering angle) that may be taken/utilized by the ego agent 102 and/or the target agent 104 to account for one another while traveling towards their respective goals 204, 206. The policy learning module 134 thereby learns respective policies $\pi_{mlt}(a_s|o_s, g_s, o_o)$ according to respective multi-agent goal-specific reward functions $R_{mlt}(s_s, a_s, g_s, o_o)$ in the presence of other agents, where "mlt" is a subscript that designated multi-agent.

The decentralized actor critic policy gradient algorithm maximizes $J_{mlt}(\theta) = E_{o_s \sim p_s^\pi, a_s \sim \pi_{mlt}, g_s \sim \mathcal{G}, o_o \sim p_o^\pi}[R_{mlt}]$ by ascending the gradient:

$$\nabla_\theta J(\theta) = \underset{\tau \sim p_\theta(\tau), g_s \sim \mathcal{G}}{E}[\nabla_\theta \log \pi_{mlt}(a_s \mid o_s, g_s, o_o) A^\pi(o_s, a_s, g_s, o_s)]$$

where $p_s^\pi$ is the other agent's state distribution. As used herein, $\tau \sim p_\theta(\tau)$ refers to $o_s \sim p_s^\pi$, $a_s \sim \pi_{mlt}$, $o_o \sim p_o^\pi$.

Referring again to FIG. 5, the method 500 may proceed to block 508, wherein the method 500 may include training the neural network 108 with the multi-agent policy. In one embodiment, upon learning the multi-agent policy $\pi_{multi}$ associated with the ego agent 102 and/or the target agent 104, the policy learning module 134 may communicate data pertaining to the multi-agent policy associated with the ego agent 102 and/or the multi-agent policy associated with the target agent 104 at particular time steps to the neural network training module 136. In one or more embodiments, the neural network training module 136 may access the memory 130 and may populate the multi-agent machine learning dataset 112 with the multi-agent policy associated with the ego agent 102 and/or the target agent 104.

In particular, the neural network training module 136 may access the multi-agent machine learning dataset 112 and populate one or more fields associated with each of the ego agent 102 and/or the target agent 104 with respective multi-agent policies for a respective time step. It is appreciated that neural network 108 may thereby be trained with multiple multi-agent policies associated with each of the ego agent 102 and the target agent 104 for multiple respective time steps based on multiple executions of the Markov Game within the single agent actor critic model and the multi-agent actor critic model. Accordingly, the neural network 108 may be trained with multiple multi-agent policies for multiple time steps that may be utilized to autonomously control the ego agent 102 and/or the target agent 104 to safely and efficiently reach their respective goals 204, 206.

Figure 7:
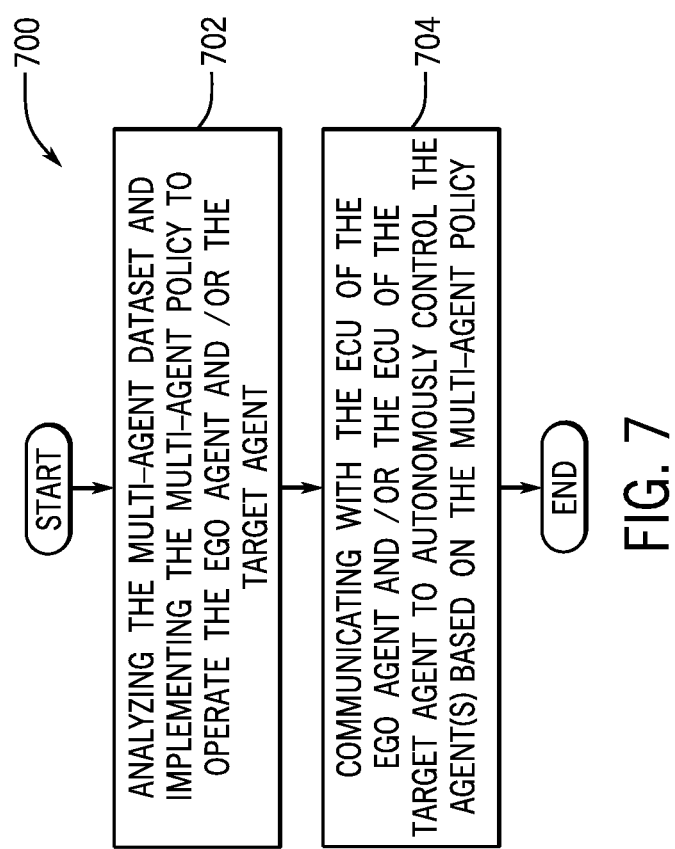
FIG. 7 is a process flow diagram of a method for controlling the ego agent and/or the target agent to navigate in a cooperative manner to their respective goals within the multi-agent environment according to an exemplary embodiment of the present disclosure.

FIG. 7 is a process flow diagram of a method 700 for controlling the ego agent 102 and/or the target agent 104 to navigate in a cooperative manner to their respective goals 204, 206 within the multi-agent environment 200 according to an exemplary embodiment of the present disclosure. FIG. 7 will be described with reference to the components of FIG. 1 and FIG. 2, though it is to be appreciated that the method of FIG. 7 may be used with other systems/components. FIG. 7 will be described with reference to the components of FIG. 1, though it is to be appreciated that the method of FIG. 7 may be used with other systems/components.

The method 700 may begin at block 702, wherein the method 700 may include analyzing the multi-agent dataset and implementing the multi-agent policy to operate the ego agent 102 and/or the target agent 104. In an exemplary embodiment, the vehicle control module 138 may access the multi-agent machine learning dataset and may analyze the dataset to retrieve a respective multi-agent policy that is associated with the ego agent 102 and/or the target agent 104 at a particular time step.

The method 700 may proceed to block 704, wherein the method 700 may include communicating with the ECU 110a of the ego agent 102 and/or the ECU 110b of the target agent 104 to autonomously control the respective agent(s) 102, 104 based on the multi-agent policy. In an exemplary embodiment, the vehicle control module 138 may analyze the multi-agent policy associated with the ego agent 102 and/or the target agent 104 and may thereby communicate with the ECU 110a of the ego agent 102 and/or the ECU 110b of the target agent 104 to autonomously control the ego agent 102 and/or the target agent 104 to be autonomously (or semi-autonomously) operated (e.g., driven) within the multi-agent environment 200 according to the respective multi-agent policy. The ECU(s) 110a, 110b may communicate with one or more of the respective systems/control units (not shown) to thereby control the ego agent 102 and/or the target agent 104 to thereby follow particular pathways at a respective speed(s), acceleration rate(s), steering angle(s), deceleration rate(s), and the like while maneuvering within the multi-agent environment 200 to reach the respective goals 204, 206 without any conflict.

Figure 8:
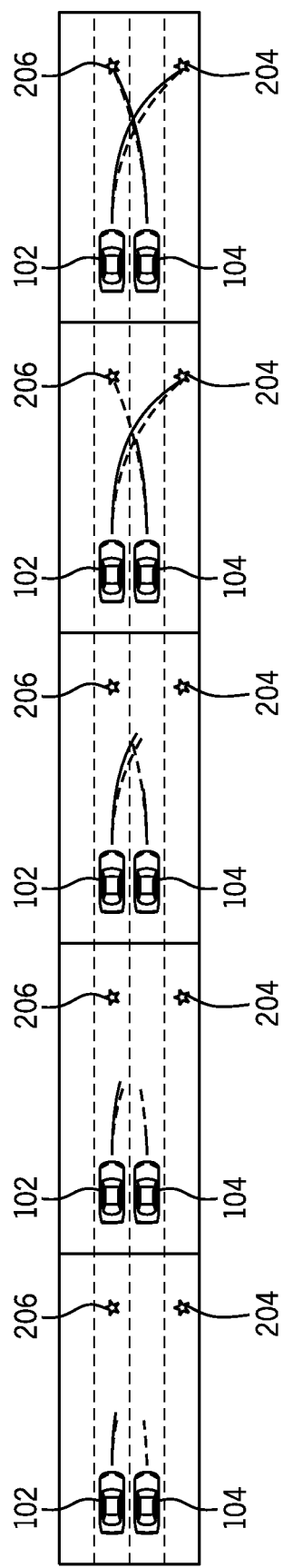
FIG. 8 is an illustrative example of performance results based on learning and implementing the single agent policy and multi-agent policy by the multi-agent application according to an exemplary embodiment of the present disclosure.

FIG. 8 is an illustrative example of performance results based on learning and implementing the single agent policy and multi-agent policy by the multi-agent application 106 according to an exemplary embodiment of the present disclosure. As shown, the ego agent 102 and target agent 104 must cross paths to reach their respective goals 204, 206. The single agent policy is represented by the dashed lines and the multi-agent policies is represented by the solid lines.

As shown, based on the autonomous control of the agents 102, 104 using the multi-agent policy, the agents 102, 104 are able to successfully interact without any conflict. Accordingly, based on the multi-agent policy learned by the application 106 and trained to the neural network 108 to be implemented, the target agent 104 may be autonomously controlled to decelerate at a particular deceleration rate according to allow the ego agent 102 to initially pass. The shape of the trajectory of the path of the ego agent 102 may also be modified based on the multi-agent policy such that any conflict is avoided with the target agent 104.

Figure 9:
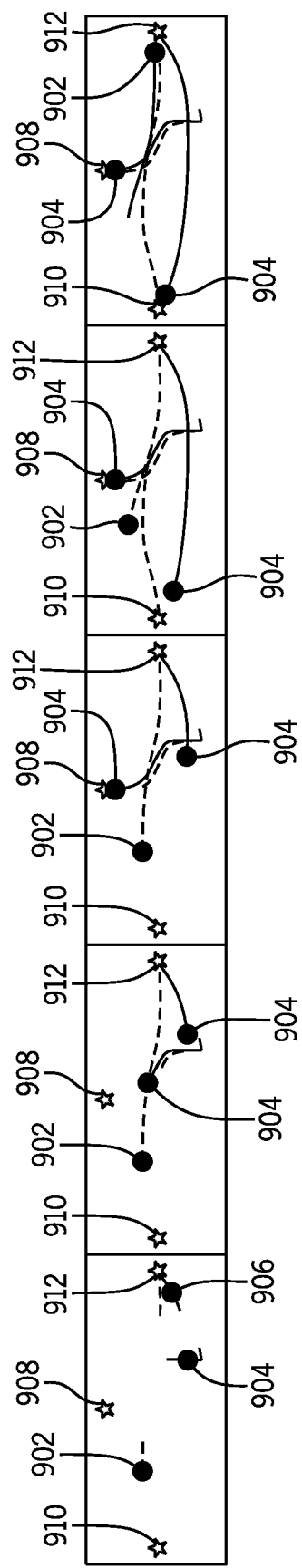
FIG. 9 is an illustrative example of performance results based on the learning of the single agent policy and multi-agent policy by multiple agents starting from a random position in a corresponding location of the multi-agent environment according to an exemplary embodiment of the present disclosure.

FIG. 9 is an illustrative example of performance results based on the learning of the single agent policy and multi-agent policy by multiple agents starting from a random position in a corresponding location of the multi-agent environment 200 according to an exemplary embodiment of the present disclosure. As shown, the agent 904 is autonomously controlled to initially proceed to its goal 908 at a high rate of speed based on the execution of the multi-agent policy. The agent 906 may be autonomously controlled to decelerate at a particular deceleration rate per the multi-agent policy and accordingly modifies the shape of its trajectory for the agent 904 to pass first as it travels to its goal 910. The agent 902 may also modify its speed based on the multi-agent policy to prevent conflict with the other agents 904, 906. As shown in both FIG. 8 and FIG. 9, the single agent policies differ in shape from the multi-agent policies based on the modification of individual goal-specific reward functions to cooperative goal-specific reward functions that are utilized to learn the respective policies.

Figure 10:
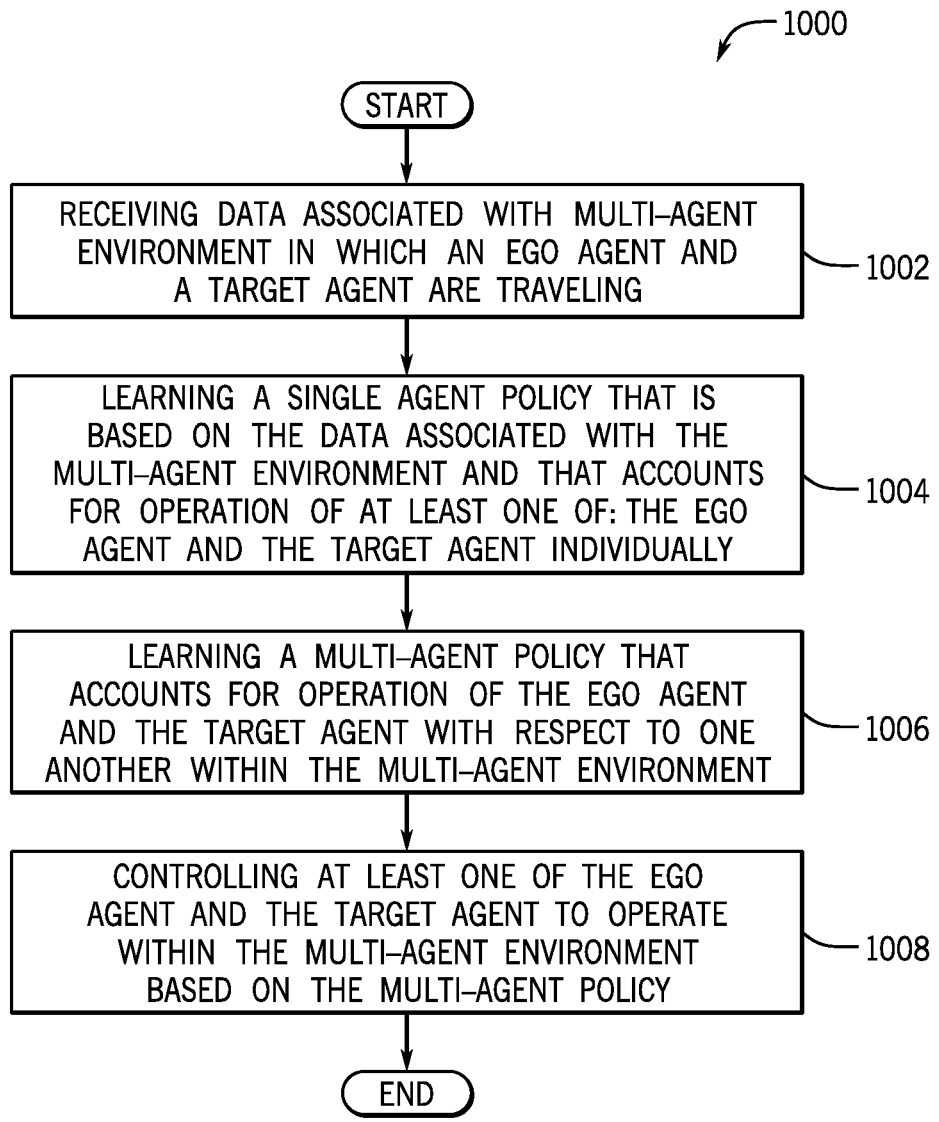
FIG. 10 is a process flow diagram of a method for multi-agent reinforcement learning according to an exemplary embodiment of the present disclosure.

FIG. 10 is a process flow diagram of a method 1000 for multi-agent reinforcement learning according to an exemplary embodiment of the present disclosure. FIG. 10 will be described with reference to the components of FIG. 1 and FIG. 2, though it is to be appreciated that the method of FIG. 10 may be used with other systems/components. The method 1000 may begin at block 1002, wherein the method 1000 may include receiving data associated with a multi-agent environment 200 in which an ego agent and a target agent are traveling.

The method 1000 may proceed to block 1004, wherein the method 1000 may include learning a single agent policy that is based on the data associated with the multiple-agent environment 200 and that accounts for operation of at least one of: the ego agent 102 and the target agent 104 individually. In one embodiment, the single agent policy is determined according to an individual goal-specific reward function.

The method 1000 may proceed to block 1006, wherein the method 1000 may include learning a multi-agent policy that accounts for operation of the ego agent 102 and the target agent 104 with respect to one another within the multi-agent environment 200. In one embodiment, the multi-agent policy is determined according to a modification of the individual goal-specific reward function to a cooperative goal-specific reward function. The method 1000 may proceed to block 1008, wherein the method 1000 may include controlling at least one of: the ego agent 102 and the target agent 104 to operate within the multi-agent environment 200 based on the multi-agent policy.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for multi-agent reinforcement learning in a multi-agent environment, comprising:
   receiving data associated with the multi-agent environment in which an ego agent and a target agent are traveling;
   learning a single agent policy that is based on the data associated with the multi-agent environment and that accounts for operation of at least one of: the ego agent and the target agent individually, wherein the single agent policy is determined according to an individual goal-specific reward function;
   learning a multi-agent policy that accounts for operation of the ego agent and the target agent with respect to one another within the multi-agent environment, wherein the multi-agent policy is determined according to a modification of the individual goal-specific reward function to a cooperative goal-specific reward function; and
   controlling at least one of: the ego agent and the target agent to operate within the multi-agent environment based on the multi-agent policy.

2. The computer-implemented method of claim 1, wherein receiving data associated with the multi-agent environment includes receiving image data and LiDAR data from at least one of the: ego agent and the target agent, wherein the image data and the LiDAR data are fused to determine a simulated multi-agent environment.

3. The computer-implemented method of claim 1, wherein learning the single agent policy includes inputting respective observations and respective goals of at least one of: the ego agent and the target agent into a single agent actor critic model that uses an actor-critic policy gradient algorithm.

4. The computer-implemented method of claim 3, wherein at least one iteration of a Markov Decision Process is executed with respect to the received data that is associated with the multi-agent environment, wherein the at least one iteration of the Markov Decision Process is implemented with the individual goal-specific reward function to provide a policy gradient for at least one of: the ego agent and the target agent to reach respective goals in an independent manner.

5. The computer-implemented method of claim 1, wherein learning the multi-agent policy includes inputting respective observations and respective goals of at least one of: the ego agent and the target agent and at least one: estimated observation of the ego agent by the target agent and estimated observation of the target agent by the ego agent into a multi-agent actor critic model that uses a decentralized actor-critic policy gradient algorithm.

6. The computer-implemented method of claim 5, wherein at least one iteration of a Markov Game is executed with respect to the received data and at least one estimated observation, wherein the at least one iteration of the Markov game is implemented with the cooperative goal-specific reward function to provide a policy gradient for at least one of: the ego agent and the target agent to reach respective goals in a cooperative manner.

7. The computer-implemented method of claim 5, wherein learning the multi-agent policy includes combining the single agent policy with an output of the multi-agent actor critic model to learn the multi-agent policy.

8. The computer-implemented method of claim 7, wherein a neural network is trained at a time step with the multi-agent policy by updating a multi-agent dataset of the neural network with data pertaining to the multi-agent policy.

9. The computer-implemented method of claim 8, wherein controlling at least one of: the ego agent and the target agent to operate includes analyzing the multi-agent dataset to implement the multi-agent policy to operate at least one of: the ego agent and the target agent to reach respective goals in a cooperative manner.

10. A system for multi-agent reinforcement learning in a multi-agent environment, comprising:
a memory storing instructions when executed by a processor cause the processor to:
receive data associated with the multi-agent environment in which an ego agent and a target agent are traveling;
learn a single agent policy that is based on the data associated with the multi-agent environment and that accounts for operation of at least one of: the ego agent and the target agent individually, wherein the single agent policy is determined according to an individual goal-specific reward function;
learn a multi-agent policy that accounts for operation of the ego agent and the target agent with respect to one another within the multi-agent environment, wherein the multi-agent policy is determined according to a modification of the individual goal-specific reward function to a cooperative goal-specific reward function; and
control at least one of: the ego agent and the target agent to operate within the multi-agent environment based on the multi-agent policy.

11. The system of claim 10, wherein receiving data associated with the multi-agent environment includes receiving image data and LiDAR data from at least one of the: ego agent and the target agent, wherein the image data and the LiDAR data are fused to determine a simulated multi-agent environment.

12. The system of claim 10, wherein learning the single agent policy includes inputting respective observations and respective goals of at least one of: the ego agent and the target agent into a single agent actor critic model that uses a decentralized actor-critic policy gradient algorithm.

13. The system of claim 12, wherein at least one iteration of a Markov Decision Process is executed with respect to the received data that is associated with the multi-agent environment, wherein the at least one iteration of the Markov Decision Process is implemented with the individual goal-specific reward function to provide a policy gradient for at least one of: the ego agent and the target agent to reach respective goals in an independent manner.

14. The system of claim 10, wherein learning the multi-agent policy includes inputting respective observations and respective goals of at least one of: the ego agent and the target agent and at least one: estimated observation of the ego agent by the target agent and estimated observation of the target agent by the ego agent into a multi-agent actor critic model that uses a decentralized actor-critic policy gradient algorithm.

15. The system of claim 14, wherein at least one iteration of a Markov Game is executed with respect to the received data and at least one estimated observation, wherein the at least one iteration of the Markov game is implemented with the cooperative goal-specific reward function to provide a policy gradient for at least one of: the ego agent and the target agent to reach respective goals in a cooperative manner.

16. The system of claim 14, wherein learning the multi-agent policy includes combining the single agent policy with an output of the multi-agent actor critic model to learn the multi-agent policy.

17. The system of claim 16, wherein a neural network is trained at a time step with the multi-agent policy by updating a multi-agent dataset of the neural network with data pertaining to the multi-agent policy.

18. The system of claim 17, wherein controlling at least one of: the ego agent and the target agent to operate includes analyzing the multi-agent dataset to implement the multi-agent policy to operate at least one of: the ego agent and the target agent to reach respective goals in a cooperative manner.

19. A non-transitory computer readable storage medium storing instructions that when executed by a computer, which includes a processor perform a method, the method comprising:
receiving data associated with a multi-agent environment in which an ego agent and a target agent are traveling;
learning a single agent policy that is based on the data associated with the multi-agent environment and that accounts for operation of at least one of: the ego agent and the target agent individually, wherein the single agent policy is determined according to an individual goal-specific reward function;
learning a multi-agent policy that accounts for operation of the ego agent and the target agent with respect to one another within the multi-agent environment, wherein the multi-agent policy is determined according to a modification of the individual goal-specific reward function to a cooperative goal-specific reward function; and
controlling at least one of: the ego agent and the target agent to operate within the multi-agent environment based on the multi-agent policy.

20. The non-transitory computer readable storage medium of claim 19, wherein learning the multi-agent policy includes combining the single agent policy with an output of a multi-agent actor critic model to learn the multi-agent policy.

* * * * *